US012048945B2

(12) United States Patent
Burns

(10) Patent No.: US 12,048,945 B2
(45) Date of Patent: Jul. 30, 2024

(54) ROOF COATING APPLICATOR METHOD OF USE

(71) Applicant: JAKULIE ENTERPRISES, LLC, Greencastle, PA (US)

(72) Inventor: Jacob Burns, Greencastle, PA (US)

(73) Assignee: JAKULIE ENTERPRISES, LLC, Greencastle, PA (US)

( * ) Notice: Subject to any disclaimer, the term of this patent is extended or adjusted under 35 U.S.C. 154(b) by 0 days.

(21) Appl. No.: 18/355,715

(22) Filed: Jul. 20, 2023

(65) Prior Publication Data

US 2023/0356260 A1 Nov. 9, 2023

Related U.S. Application Data

(63) Continuation of application No. 18/195,421, filed on May 10, 2023, now Pat. No. 11,872,586, which is a continuation of application No. 16/907,482, filed on Jun. 22, 2020, now Pat. No. 11,654,453.

(60) Provisional application No. 62/872,209, filed on Jul. 9, 2019.

(51) Int. Cl.
*B05C 17/005* (2006.01)

(52) U.S. Cl.
CPC .............................. *B05C 17/00593* (2013.01)

(58) Field of Classification Search
CPC ........ B05C 17/00593; B05C 17/00576; B05C 17/00516; B05C 17/01; B05C 17/00509
See application file for complete search history.

(56) References Cited

U.S. PATENT DOCUMENTS

| | | | | |
|---|---|---|---|---|
| 4,180,187 A * | 12/1979 | Ben-Haim | G01F 11/026 | 222/326 |
| 4,376,498 A * | 3/1983 | Davis, Jr. | B05C 17/015 | 222/326 |
| 5,046,642 A * | 9/1991 | Cathcart, Sr. | B05C 17/0103 | 222/326 |
| 5,918,770 A * | 7/1999 | Camm | B05C 17/00516 | 222/137 |
| 5,937,628 A * | 8/1999 | Matechuk | E04F 21/244 | 56/400.05 |
| 7,905,654 B1 * | 3/2011 | Cordero | B01F 31/445 | 366/256 |
| 2003/0136859 A1 * | 7/2003 | Borden | E01C 23/22 | 239/1 |

(Continued)

*Primary Examiner* — Donnell A Long
(74) *Attorney, Agent, or Firm* — David Colls; Berger Singerman LLP

(57) ABSTRACT

A disposable roof coating applicator includes a nozzle that is attached to a collar. The nozzle and collar are selectively attachable to a body that has an interior space and is formed by at least one side wall having an exterior wall and an interior wall. The coating applicator also includes a plunger that is movably disposed within the interior space of the body. The coating applicator may include a locking mechanism about the applicator's collar that selectively engages a stud provided on the body's exterior surface, selectively locking and unlocking the nozzle and collar assembly to the body. The disposable roof coating applicator is configured and otherwise designed to take in, store and transport approximately ½ to 2 gallons of viscous material to a roof seam before neatly and uniformly expelling the viscous material to the seam or joint.

20 Claims, 14 Drawing Sheets

(56) References Cited

U.S. PATENT DOCUMENTS

| | | | | |
|---|---|---|---|---|
| 2009/0272767 | A1 * | 11/2009 | Herman | B65D 83/0033 222/326 |
| 2018/0133747 | A1 * | 5/2018 | Bowers | B05C 17/0052 |

* cited by examiner

ROOF COATING APPLICATOR METHOD OF USE

CROSS-REFERENCE TO RELATED APPLICATIONS

This continuation application claims the benefit of U.S. Nonprovisional patent application Ser. No. 18/195,421, filed on May 10, 2023, and continuation U.S. Nonprovisional patent application Ser. No. 16/907,482, filed on Jun. 22, 2020, and Provisional Patent Application Ser. No. 62/872,209, filed on Jul. 9, 2019, all of which are incorporated herein in its entirety.

FIELD OF THE INVENTION

The present invention relates generally to a roofing applicator, and more particularly, to a disposable roof coating applicator that can be used to dispense material of high viscosity, such as elastomeric, to roof seams in membrane or to metal roof finishes neatly, quickly and accurately.

BACKGROUND OF THE INVENTION

As long as man has been around there has been a need for shelter and protection from the elements, leading to the development of the roof system, which is typically made out of available resource. In developing countries, roofs are usually built with dry vegetation such as straw, sedge, reed, or palm branches, that have been layered so as to shed water away from the inner roof (or ceiling). This form of craft building is commonly known as thatching. By contrast, in developed countries, such as Europe and the United Kingdom, and in some areas of the United States, slate is used. Slate is a type of rock that can be broken into tile shapes easily because of its fine grain. In the United States, however, the type of roofing material that most Americans are familiar with is shingles. While shingles encompass a variety of materials, the term is generally used to describe overlapping rectangular material. Shingles can be made from wood (i.e., shakes), asphalt, ceramics, or composite. Tile is another common type of roofing material. Although tile is functional and aesthetically pleasing, it is made from a ceramic that over time can become brittle. Metals are also popular materials used around the entire world. Metal roofs can range from cheap for developing countries to very expensive for wealthy home/business owners. Metal roofs have a lot of advantages over other types of roofing material. For instance, metal is resistant to almost all types of natural elements and is very energy efficient.

Regardless of the roofing material that is chosen to be used, roofers, engineers, and the like have spent years looking for ways on how to optimize and perfect the practice of roofing. For instance, in 1896 Barrett Manufacturing Co. developed a method on roofing construction, which comprised of alternating layers of asphalt, impregnated fabric and bituminous coatings, that changed the shape of buildings. The steep-slope roof was no longer required necessary for rain protection, and the flat roof opened the way for a new era in roofing appearances.

Over the decades' innovations in the roofing industry continue to surface. However, despite the many advancements in the roofing industry, no roof has an indefinite life expectancy. Over time exposure to the elements causes damage to the roof, resulting in leakages that penetrate and damage the structure's interior. For instance, metal roof systems are prone to expansion and contraction. This is a result of the metal panels moving because of temperature changes. The movement creates stress points at points of attachments (i.e., seams), and are often the catalyst of roof problems.

As a metal roof ages the frequency of leaks will normally increase. Eventually, the rate of leaks and the overall condition of the roof system will require a significant scope of work. The roof will continue to age unless it is replaced or restored. Restoration is an excellent approach if one is striving to rejuvenate and extend the life of their roof, and a great alternative to a roof replacement. Metal roof restoration typically consists of a few steps that generally includes repairing any deficiencies (e.g., opening in seams, cracks, etc.), including fastener replacements. After the repairs have been completed it is recommended that a coating be applied to the surface of the roof system. Coating materials may include, an acrylic coating, silicone coating and urethane coating, both of which are materials of high viscosity. Although roof restoration provides additional benefits in lieu of roof replacement, working with materials of high viscosity can be difficult and expensive. Machinery that is meant to be used with such materials of high viscosity tend to clog, break, and are overall unreliable making it an uncomfortable and inconvenient solution for roof repairs.

Accordingly, there is an established need for a time-saving, cost effective roof coating applicator that is disposable and that can be used to dispense material of high viscosity, such as elastomeric, to roof seams in membrane or to metal roof finishes neatly, quickly and accurately.

SUMMARY OF THE INVENTION

The present invention is directed to a disposable roof coating applicator. The disposable roof coating applicator, or roof tube, is a lightweight, low-cost tool to manufacture that can be used by a user to dispense material, including material of high viscosity, such as, elastomeric, to roof seams and joints quickly, neatly, and accurately with minimal waste. It also allows the user to apply a necessary amount of material to properly seal a seam, or joint, while the user remains in an upright position (i.e., standing up). The roof coating applicator is designed to reduce the possibility of clogging when in use, which means that the roof coating applicator can be used in lower temperatures that would otherwise cause other elastomeric (or high viscous material) application systems to clog and fail.

Introducing a first embodiment of the invention, the present invention comprises,

- a body having a proximal end, a distal end, and an interior space;
- a nozzle selectively attachable to the distal end of the body; and
- a plunger assembly including a handle axially aligned with the body, the plunger assembly movably disposable within the interior space of the body,
  - wherein the interior space of the body is configured to retain up to two gallons of viscous material.

In a second aspect, the plunger can comprise a head subassembly, a first shaft, and a handle.

In another aspect, the first shaft may include a hollow interior, and an aperture.

In yet another aspect, the first shaft and handle are rectangularly-shaped with rounded edges.

In another aspect, the head subassembly of the plunger further can comprise a head having at least one ribbed protrusion about its exterior and is attached to a second shaft having at least one aperture.

In yet another aspect, the second shaft of the head subassembly is rectangularly-shaped with rounded edges.

In another aspect, the plunger can further comprise a locking pin.

In another aspect, the first shaft may be selectively coupled to the second shaft with the locking pin.

In another aspect, the body may include a stop cap affixed to the proximal end of the body to confine the plunger inside of the body.

In another aspect, the collar of the disposable roof coating applicator may include a locking mechanism.

In another aspect, the locking mechanism can comprise a J-shaped or L-shaped cutout.

In another aspect, the body of the disposable roof coating applicator can comprise at least one side wall having an exterior side and an interior side.

In yet another aspect, the body may include a stud disposed about its exterior side that selectively engages the collar's locking mechanism to lock and unlock the collar to the body.

In yet another aspect, wherein the head of the head subassembly may be made out of a rubber compound.

In yet another aspect, wherein the nozzle of the disposable roof coating applicator may include an irregular cone-shaped nose and a flanged opposite end.

In another aspect, the hollow interior of the body may be able to store approximately ½ a gallon of viscous material therein.

In another aspect, the hollow interior of the body may be able to store approximately a gallon of viscous material therein.

In another aspect, the hollow interior of the body may be able to store approximately at least 2 gallons of viscous material therein.

In yet another aspect, a method of operating a disposable roof coating applicator comprises the steps of:

- providing a roof coating applicator, the roof coating applicator comprising,
  - a nozzle,
  - a collar having a first end and a second end,
  - a body having a distal end, a proximal end, and an interior space,
    - wherein the first end of the collar is selectively attachable to the nozzle, and the second end of the collar is selectively attachable to the front end of the body, and
  - a plunger assembly movably disposed within the interior space of the body, the plunger assembly comprising,
    - an elongated member having a first end and a second end;
    - a head subassembly attached to the elongated member at the first end, the head subassembly comprising a head having at least one ribbed protrusion about an exterior surface, and a second elongated member extending outwardly from an end of the head; and
    - a handle attached to the elongated member at the second end, opposite the first end, and
  - a stop cap affixed to the proximal end of the body to confine a portion of the plunger assembly inside of the interior space of the body;
- removing the collar and nozzle from the body;
- inserting the distal end of the body into a receptacle that contains viscous material;

- pulling on the handle of the plunger assembly to create suction and introduce material into the interior space of the body;
- attaching the collar and nozzle to the body; and
- pushing the handle to move the head of the head subassembly of the plunger assembly to selectively push the viscous material inside of the interior space of the body out through the nozzle to apply the viscous material to a seam.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Figure 1:
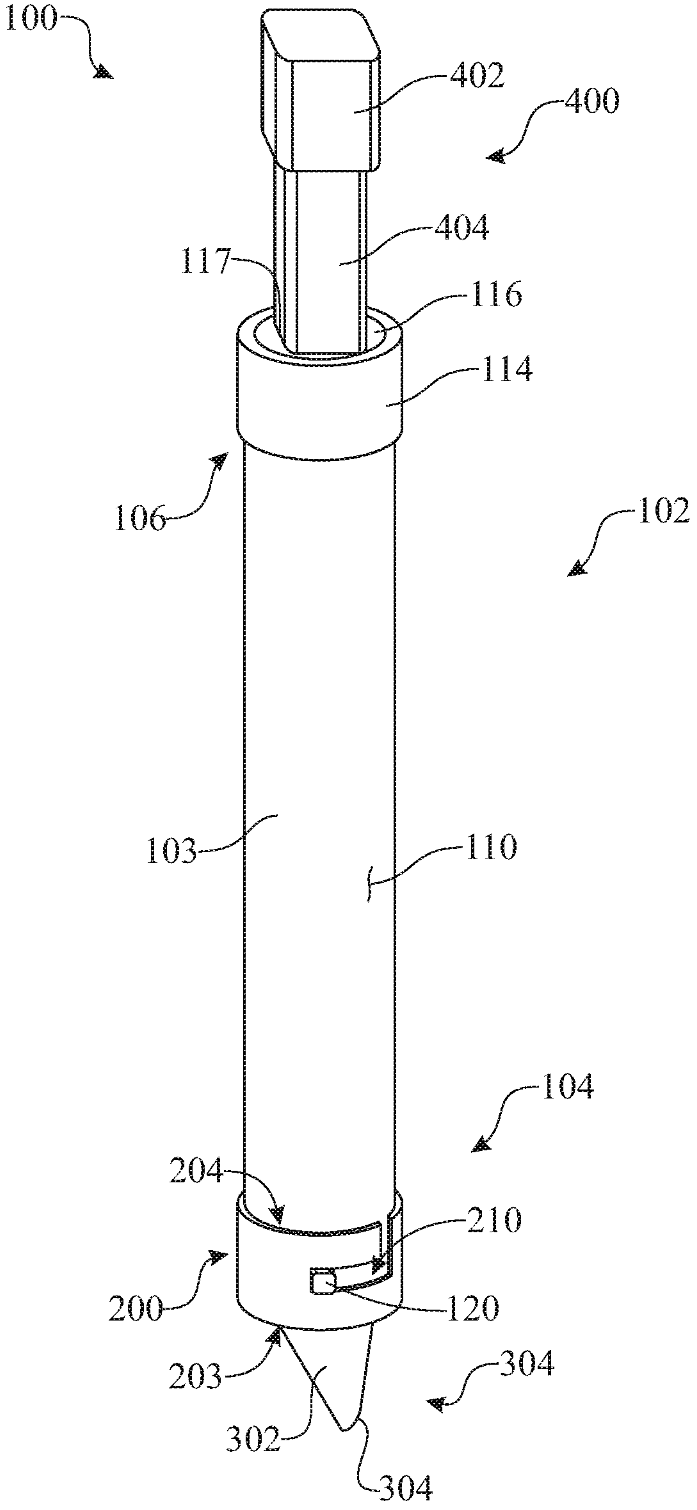
FIG. 1 presents a top perspective view showing a first embodiment of the disposable roof coating applicator of the present invention.
Figure 2:
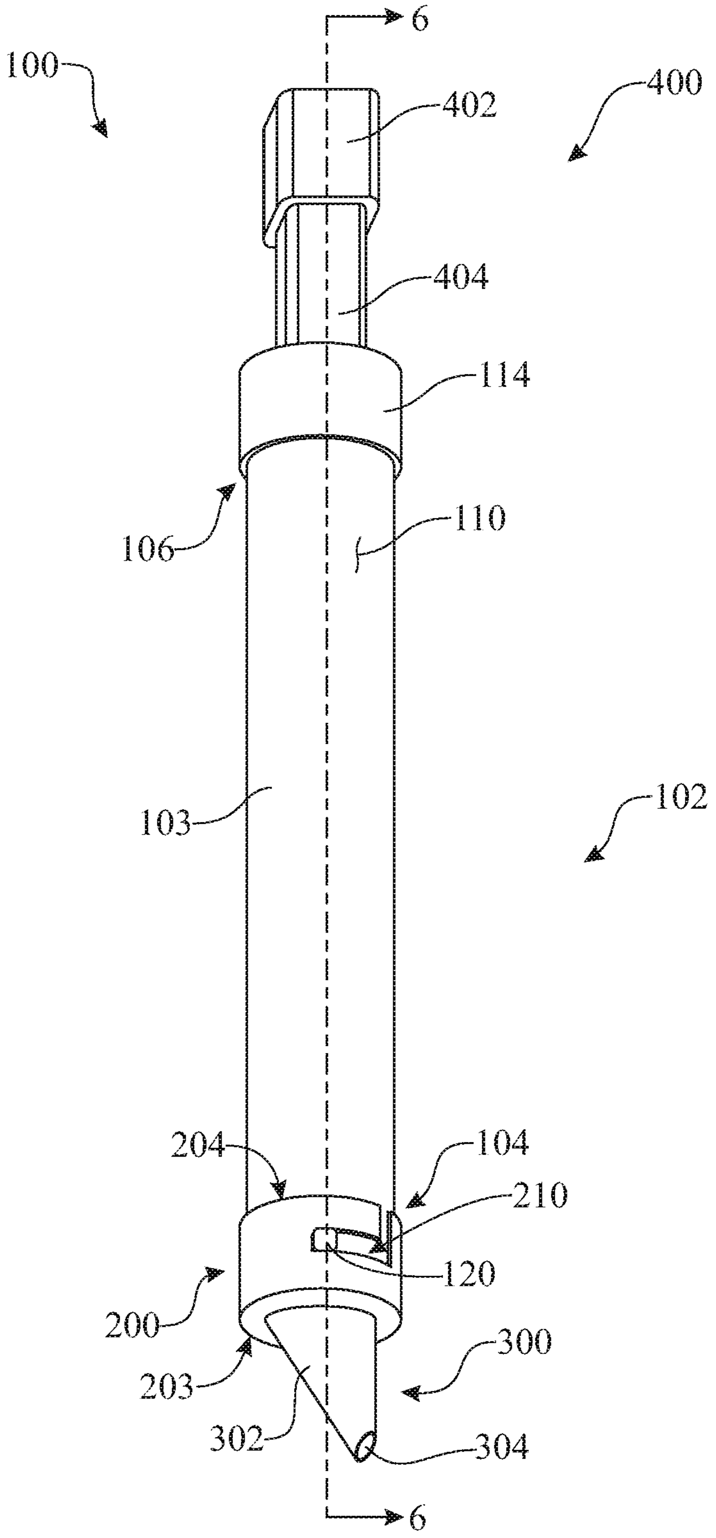
FIG. 2 presents a bottom perspective view of the first embodiment of the disposable roof coating applicator of the disposable roof coating apparatus of FIG. 1.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring initially to FIGS. 1-3 and 6, an exemplary embodiment of a disposable roof coating applicator 100 is generally shown. The roof coating applicator 100 generally comprises a body 102, a collar 200, a nozzle 300, and a plunger assembly 400 that are subsequently organized together to form the roof coating applicator 100. The roof applicator's body 102 includes a distal end 104 and a proximal end 106, and may be formed by at least one side wall 103 that extends longitudinally about a centralized axis A. The at least one side wall 103 includes an exterior side 110 and an interior side 112, and forms an interior space 118. The body 102 includes a stop cap 114 that includes a first opening 115, a back wall 116, and a second opening 117 that is smaller than the first opening 115. The interior diameter D1 of the first opening 115 of the stop cap 114 is larger than the exterior diameter D2 of the body 102, allowing the stop cap 114 to be selectively coupled to the proximal end 106 of the body 102. As one example, the stop cap 114 may be coupled to the body 102 by lining the interior side wall of the interior diameter D1 of the stop cap 114 with an adhesive before sliding the first opening 115 of the stop cap 114 over the proximal end 106 of the body until the back wall 116 of the stop cap 114 is adjacent and in contact with the outer edge 113 of the body's proximal end 106. Alternative coupling means may also include the stop cap 114 and proximal end 106 of the body 102 having threads that threadably engage. Of course, one will appreciate that alternative attaching means may be utilized without departing from the intended scope of the invention. It is also contemplated that a stud 120 be affixed to the body's exterior side 110 near its distal end 104 of the body 102.

Figure 3:
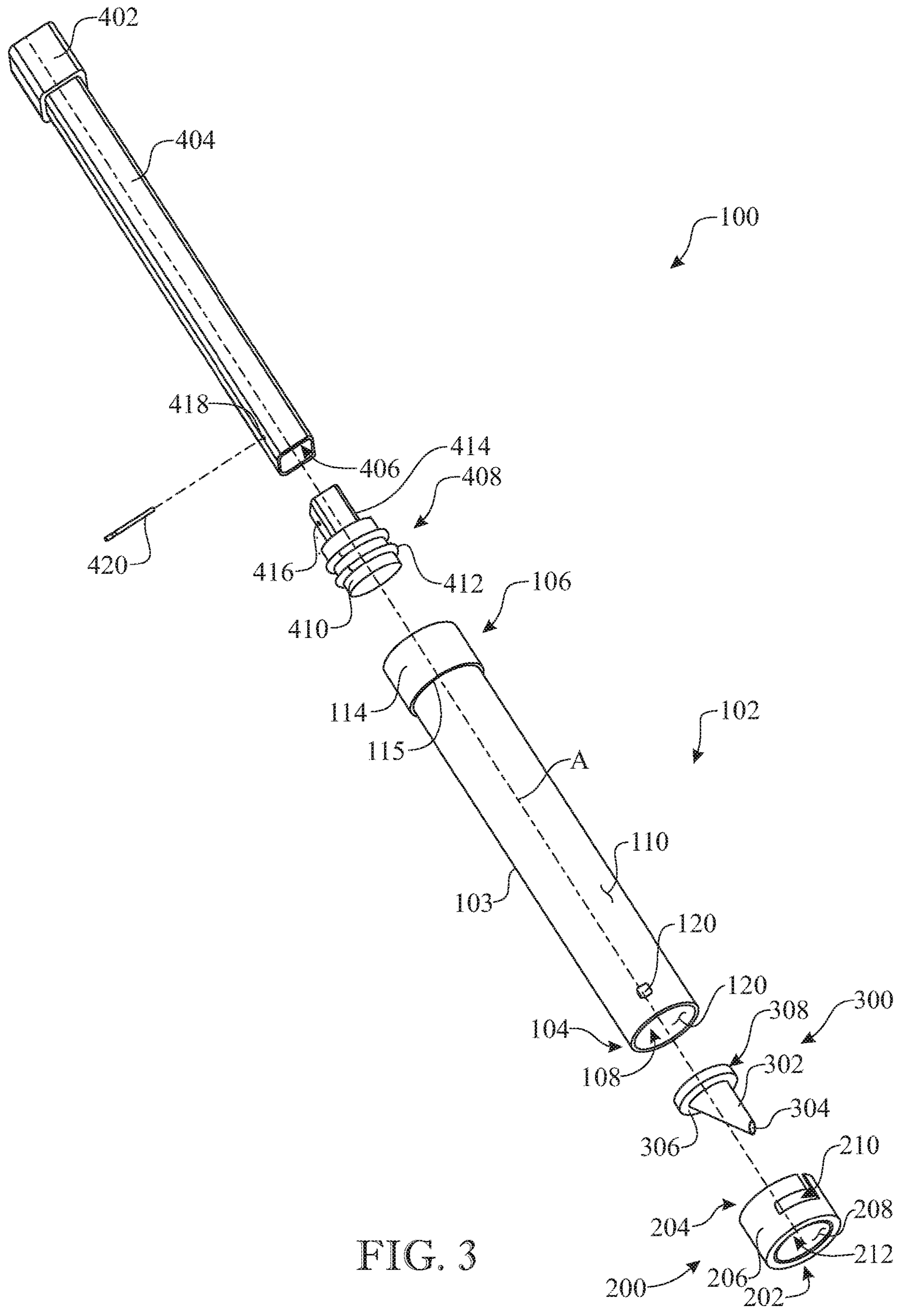
FIG. 3 presents a bottom perspective, exploded view showing the disposable roof coating applicator of the present invention.
Figure 5:
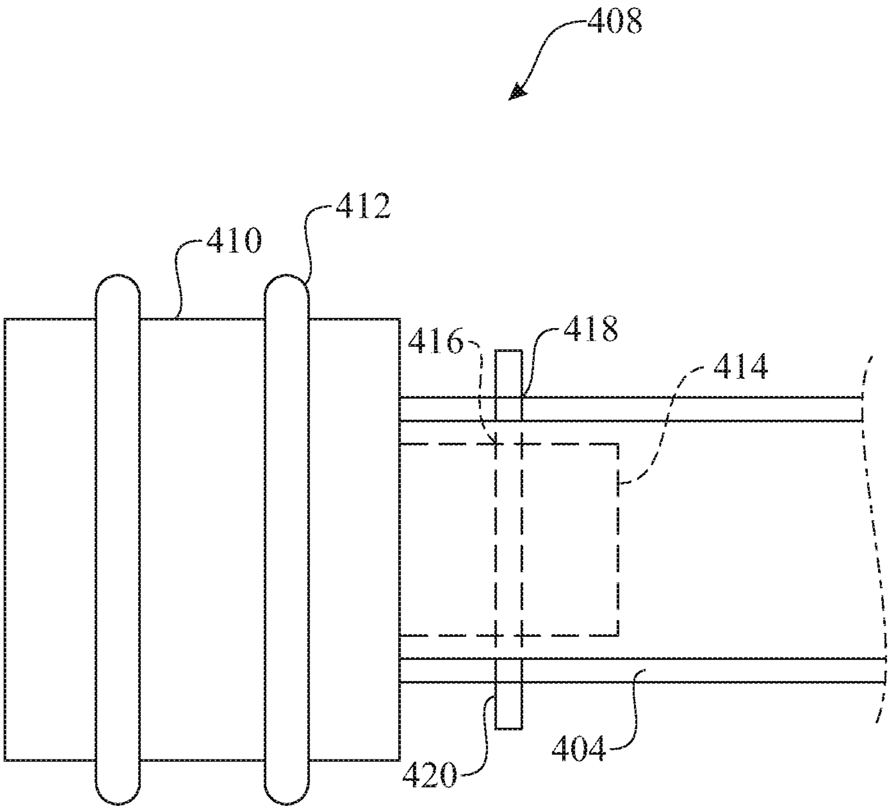
FIG. 5 presents a side elevation view of the plunger head of the disposable roof coating applicator.

Attention is now directed to FIGS. 3 and 5, which show details of the plunger assembly 400 comprised in the roof coating applicator 100. The plunger assembly 400 generally includes a handle 402 that is attached to a first shaft 404 that may have a hollow interior 406. The shaft 404 may also include an aperture 418 on a side of the shaft 404 and on the opposite end of the shaft's handle 402. Included in the plunger assembly 400 is a plunger head subassembly 408. The head subassembly 408 includes a head 410 that may include ribbed protrusions 412, giving the head a honeycomb appearance, and may be made out of a rubber material. However, alternative head-shaped configurations and material may be utilized. For example, the head 410 may be made out of a specialized plastic that increases the suction force effect provided by the plunger assembly 400. Another example of a plunger head not presently shown may include the combination of a pair of metal washers in between O-rings and followed by rubber washer at one end. A screw that traverses the O-rings and washers can hold the combination of metal washers, O-rings, and rubber washers together with a nut fastened to its end to compress the washers and O-rings together. This configuration also gives the head a honey-comb appearance.

Affixed to the proximal end of the head 410 is a second shaft 414, which includes aperture 416 located on a side thereof. As is best seen in FIG. 3, the second shaft 414 of the subassembly 408 and first shaft 404 may be selectively coupled to each other. This can be done, as an example, by inserting the subassembly's 408 second shaft 414 inside of the first shaft's hollow interior 406. Once shaft 414 and shaft 404 are engaged, the first shaft's aperture 418, and the subassembly's second shaft aperture 416 may be properly aligned. After the apertures 414, 416 are aligned a locking pin 420 may be selectively inserted through each aperture 414, 416 to lock the subassembly 408 to the shaft 404 and handle 402 so that they do not move axially relative to one another. Alternative embodiments are contemplated to those shown in the drawings. For instance, while the shaft 404 and shaft 414 have been illustrated to be rectangular with rounded edges, alternative shapes can be included, such as round, oval, elliptical, or the like.

Figure 10:
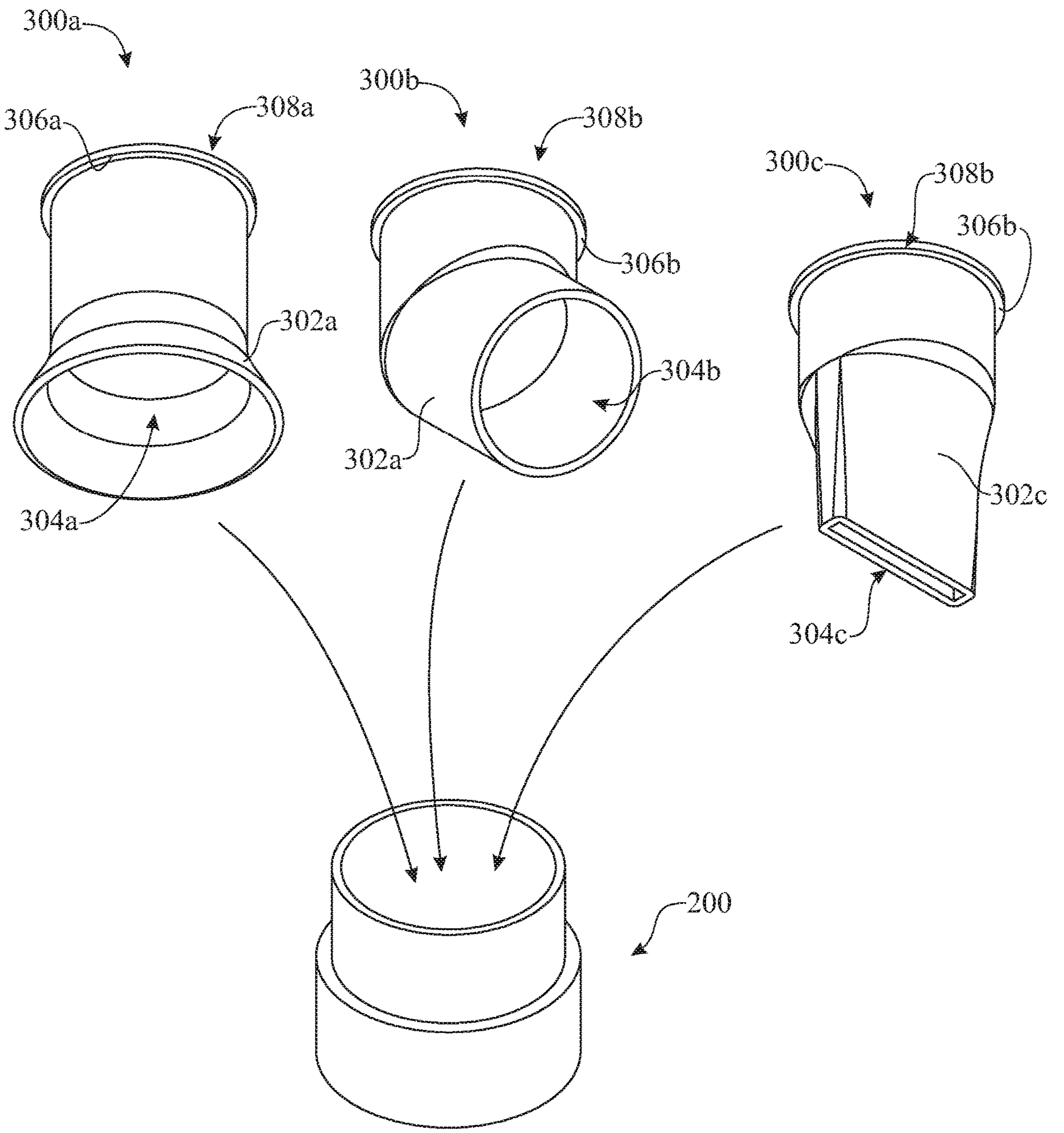
FIG. 10 presents a perspective view of a plurality of nozzles that connect to the disposable roof coating applicator's collar.

Referring to FIGS. 3 and 5, show details of the nozzle 300 and collar 200 of the roofing coating applicator 100. The nozzle 300 of the roof coating applicator 100 may generally include a tip 302 that has a material application hole 304, a material receiving hole 308, and a collar or flange 306. It should be readily understood that the nozzle 300 may be provided in different shapes and sizes, or a plurality of nozzles may be provided, in order to satisfy different material application needs. For example, as illustrated in FIG. 10, a plurality of nozzles are generally shown that work with the roof coating applicator 100. As shown, at least one nozzle 300*a* may be shaped to include a proximal receiving hole 308*a*, a flange 306*a*, and a distal end tip 302*a* having a material application hole 304*a*. The material application hole 304*a* of the present nozzle 300*a* being larger than the receiving hole 308*a* of the nozzle 300*a*. In another exemplary embodiment, another nozzle 300*b* may be provided and shaped to include a proximal receiving hole 308*b*, a flange 306*b*, and a distal end tip 302*b* having a material application hole 304*b*. This particular nozzle 300*b* may include a distal end tip 302 that extends at an angle (e.g., about 20 to about 25 degrees) from the proximal end of the nozzle 300*b*. In yet another embodiment, a separate nozzle 300*c* may be provided and shaped to include a proximal receiving hole 308*c*, a flange 306*c*, and a distal elongated narrow, flat tip 302*c* having an application hole 304*c*. Each tip may include threads that directly engage threads disposed on the collar or body. Moreover, each tip is designed to supply viscous material 118 (FIG. 8) to seams, cracks, or the like. Alternatively, the nozzle may be provided as is shown in the exemplary embodiment (FIGS. 1-4), and include an irregular, cone-shaped head. It is also contemplated that the nozzle(s)—as well as the housing, collar, and certain elements of the plunger—be constructed of a high grade plastic that is durable under extreme conditions. This allows a user to use the roof applicator under low temperatures without having to worry about clogging.

With continued reference to FIG. 3, the roof coating applicator's collar 200 may generally include a first end 202 and a second end 204, and at least one side wall extending between the first end 202 and the second end 204 that provides a centralized opening 212 which extends through the collar 200. The at least one side wall includes an external side 206, and an internal side 208, and a flange 201. The collar 200 may also include a locking mechanism 210 that selectively engages the stud 120—that was described herein above—to lock the collar 200 and nozzle 300 to body 102. For instance, the stud 120 and locking mechanism 210 of the present embodiment are configured to engage with one another in a bayonet-type connection. As is shown in the accompanying figures, the locking mechanism 210 disposed about the collar 200 may include an L-shaped cutout groove. However, alternative locking mechanisms may be utilized to lock the nozzle 300 and collar 200 to body 102. For example, the collar 200 may include a latching mechanism, or internal threads that are threadably attached to the body 102.

Figure 11:
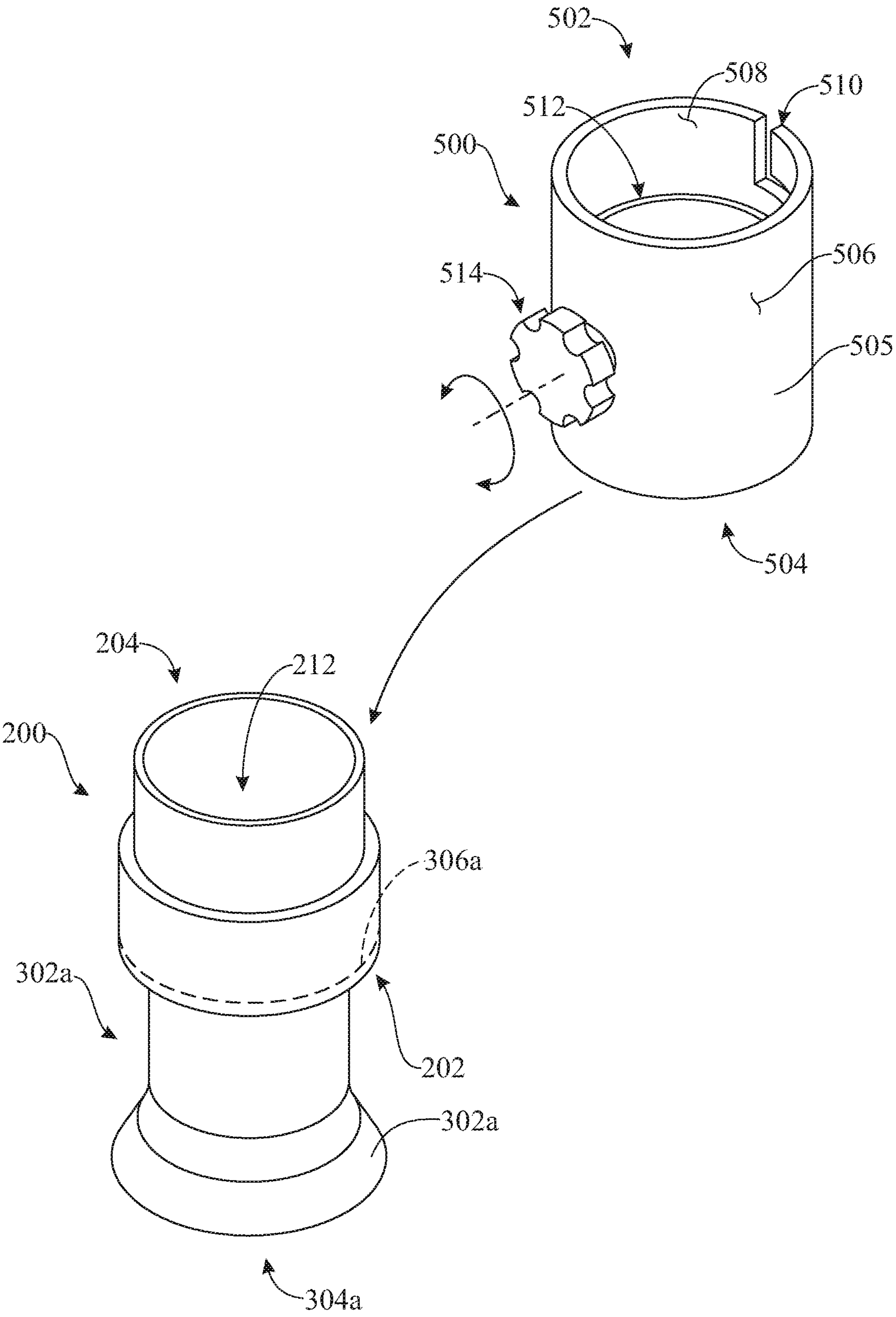
FIG. 11 presents a flow control valve attachable to a collar and nozzle of the disposable roof coating applicator of the present invention.
Figure 12:
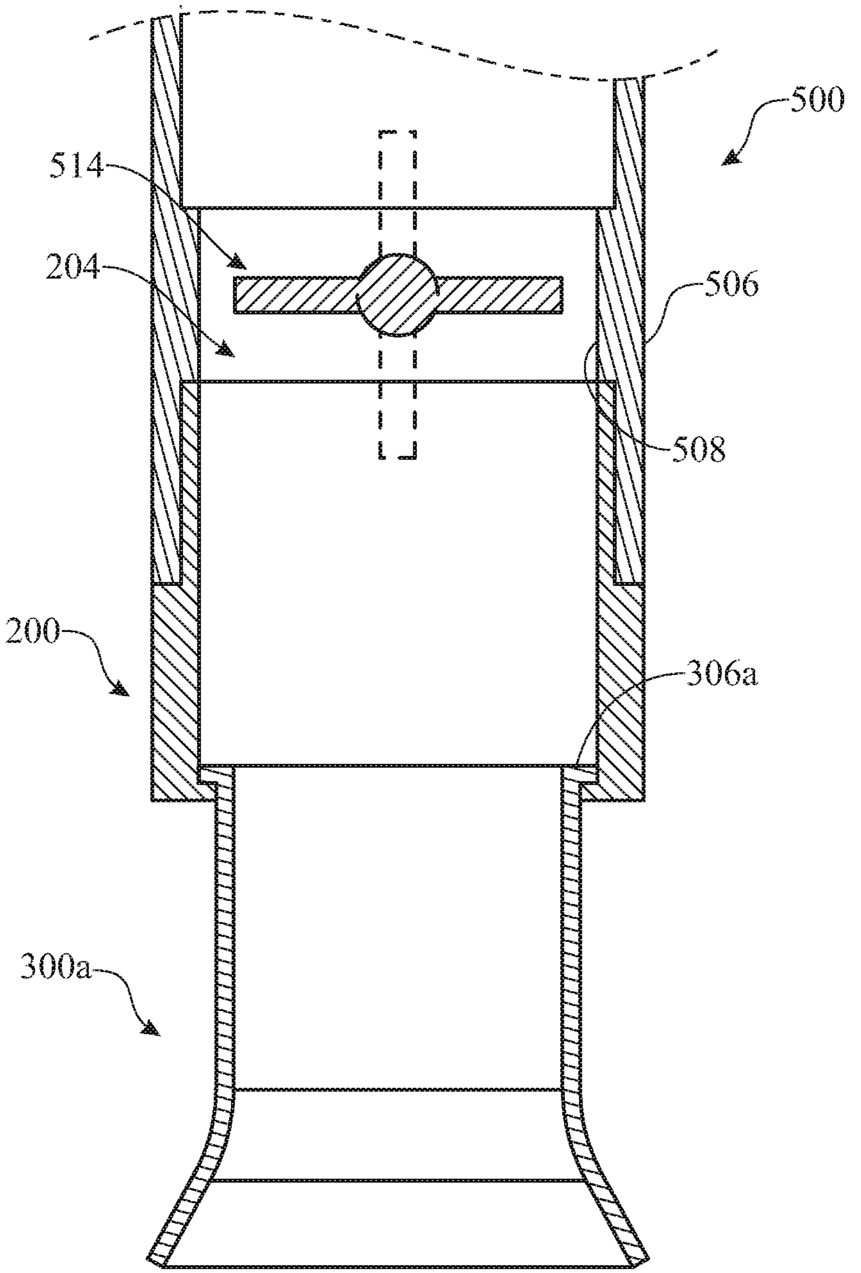
FIG. 12 presents a cross-sectional side elevation view of the flow control valve coupled to the collar and nozzle of the disposable roof coating applicator.

With reference now to FIGS. 11 and 12, at least one nozzle 300*a* of the plurality of nozzles that can be used with the roof coating applicator 100 is shown attached to a collar 200. A control valve housing 500 is also shown, where the control valve includes a first end 502, a second end 504, and at least one side wall extending between the first end and the second end providing a centralized opening 512 that extends through the entire collar 500. The at least one sidewall 505 includes an external side 506, and an internal side 508. The control valve housing includes a valve 514, such as a ball valve, that is designed to control the flow rate of material being applied by the roof coating applicator 100. In this exemplary embodiment, the control valve 500, instead of the collar 200, may include a locking mechanism 510 that engages the stud 120 on the body 102 (FIG. 3) of the roof coating applicator 100 in a bayonet-type connection. To connect the collar 200 to the control valve, the second end 204, which has a small diameter outer diameter than the inner diameter the valve 500, is coupled to the second end 504 of the control valve. Subsequently, the first end 502 of the control valve 500 may be coupled to the distal end 104 of the roof coating applicator 100. One will appreciate that the control valve housing 500 in an alternative exemplary embodiment may include threads that engage a set of threads on the body to attach the control valve housing to the body. As shown in FIG. 12, the control valve 514 can be in a closed position, which prevents any material from escaping the interior space of the body of the roofing applicator. By turning the dial of the control valve 514, to an open or partially open position, one will be able to regulate the amount of material that comes out of the roof coating applicator.

Figure 13:
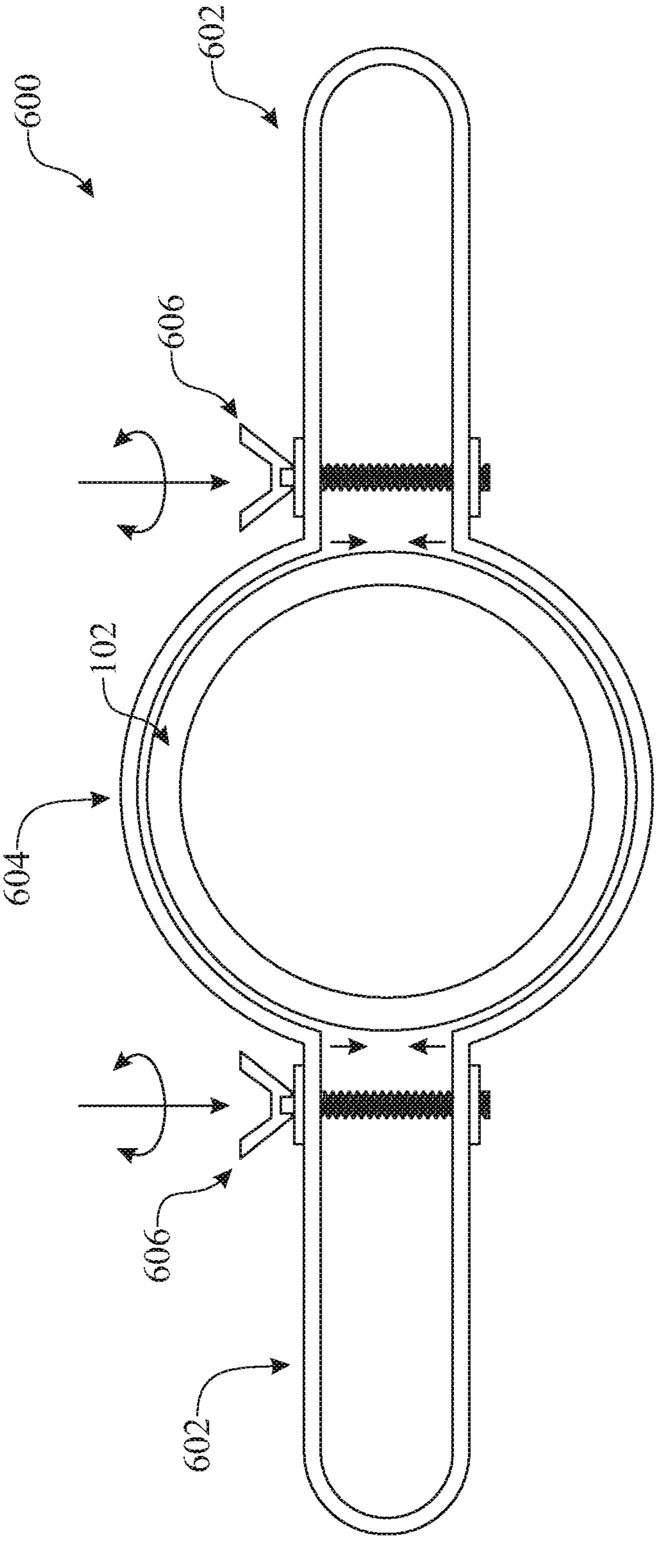
FIG. 13 presents a top elevation view of a handle that may be used in conjunction with the disposable roof coating applicator.
Figure 14:
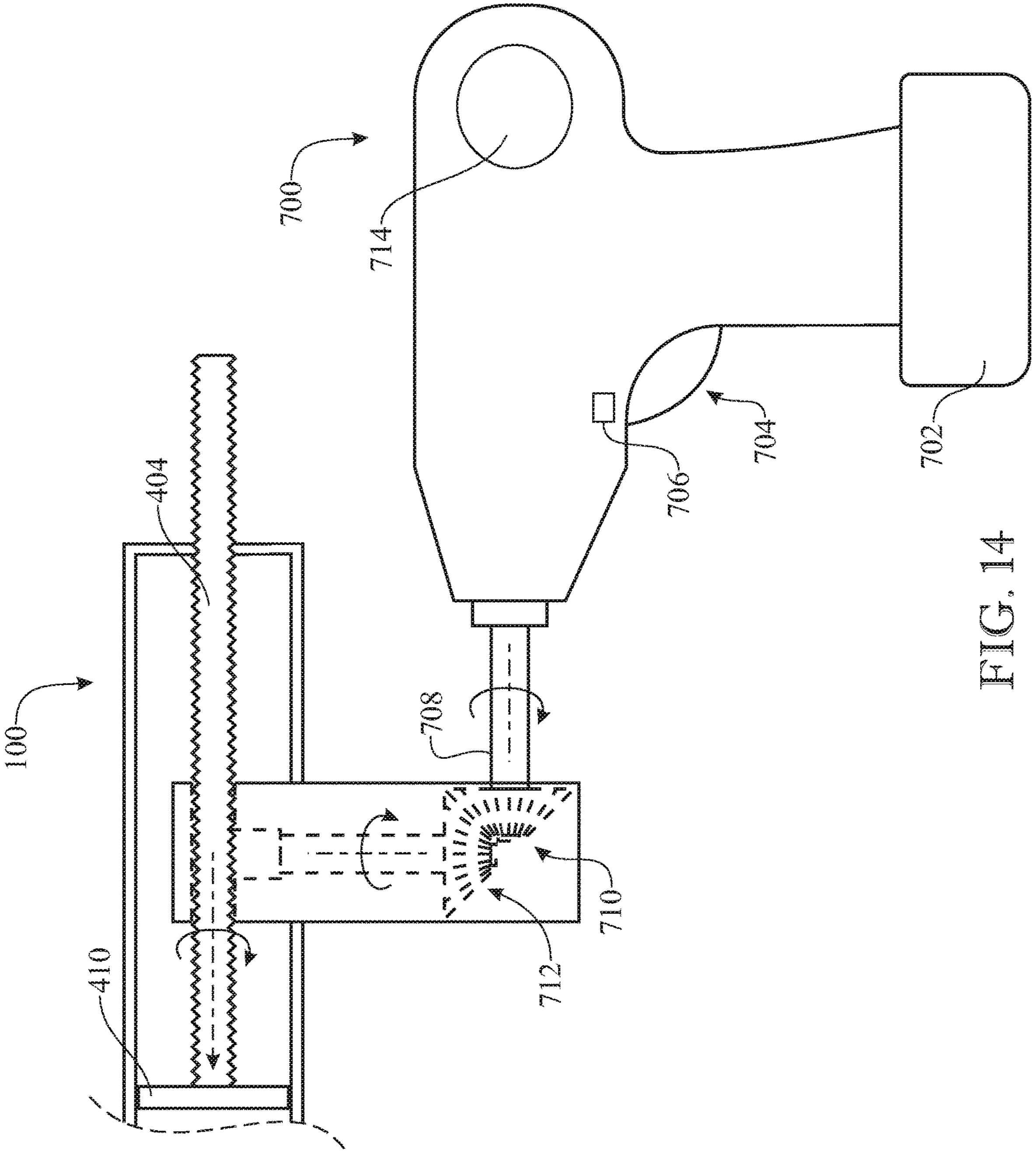
FIG. 14 presents an exemplar, alternative embodiment illustrating how an electrical drill may be used to control the translational movement of the plunger assembly.

Turning quickly now to FIGS. 13 and 14, there is shown a number of external devices that can be used in connection with the roof coating applicator 100. For instance, as shown in FIG. 13 an attachable handle 600 may be used with the roof coating applicator to provide the user with an option for a secondary handle. The handle 600 may include a clamp like configuration where it includes a set of arms 602 opposite one another, and a central clamp mount 304. The central clamp mount 304, which is adjustable, can be disposed anywhere along the length the body 102 of the roof coating applicator and tightened into place using a fastener mechanism 606. Once the arms 600 are clamped into place, the user can grab the one arm 602 of the handle 600 with one hand, and grab the handle 402 of the plunger assembly with the other hand to operate the roof coating applicator 100.

Referring now to FIG. 14, an electronic device 700 is shown engaging the plunger assembly 400 of the roof coating applicator 100. The electronic device 700 may include a motor 714, an internal power supply 702, such as a battery, or be connected to a power supply (not shown), such as an electricity outlet. The electronic device 700 may also include a trigger 704, a rotational head 708, and a directional switch 706 that controls the direction of rotation of the rotational head 708. The rotational head 708 may be attached to a beveled or crown gear 710 that engages a secondary gear 712 on one end that is normal to the crown gear 710. The secondary gear, on an opposite end, can be configured to engage the shaft 404 of the plunger assembly 400. In this configuration, the shaft may include 404 gear teeth that engage the secondary gear 712 in a worm gear type configuration to provide translational motion of the shaft 404 and plunger head 410. Of course, one will appreciate that alternative means may be employed to provide translational motion of the shaft and head of the plunger assembly. In one exemplary embodiment, the electronic device 700 may be used to push material out of the body of the roof coating applicator by engaging the directional switch that engages the rotational head of the device 712 to rotate and thereby cause the plunger head to move in the direction of the nozzle of the roof coating applicator, which in turn causes material to spill out of the nozzle of the applicator. Alternatively, by engaging the directional switch 706 on the electronic device to rotate the rotational head in the opposite direction, the user can retract the plunger head 410 away from the nozzle.

Referring now to FIGS. 1 and 3-6, an illustrative assembly process of the disposable roof coating applicator 100 is described.

The assembly process generally comprises the handle 402 being selectively attached to a rear end of the first shaft 404. Although there are many ways on how to attach the handle 404 to the first shaft 404, it is preferred that the shaft 404 and handle 402 be permanently adhered to one another. This could be done through the use of a high grade adhesive, or through the use of a plurality of fasteners. Once the first shaft 404 and handle 402 have been attached at one end, the end of the shaft 404 not attached to the handle 402 (i.e., the opposite or front end of the shaft), is inserted through the second opening 117 (FIG. 1) provided on the back wall 116 of the stop cap 114 that is affixed to the body 102. In the event the stop cap 114 is not already affixed to the body 102, before inserting shaft 404 through the second opening 117 of the stop cap 114, the interior side wall of the interior diameter D1 of the stop cap 114 is lined with an adhesive. Once the adhesive is applied, the first opening 115 of the stop cap 114 is slid over the proximal end 106 of the body 102 until the back wall 116 of the stop cap 114 is adjacent and in contact with the outer edge 113 (FIG. 6) of the body's proximal end 106. After the stop cap 114 has been affixed to the proximal end 106 of the body 102, shaft 404 is inserted through the second opening 117 on the back wall 116 of the stop cap 114, and may be pushed until the front end of the shaft 404 protrudes out of the unit's 102 hollow interior 108.

Figure 4:
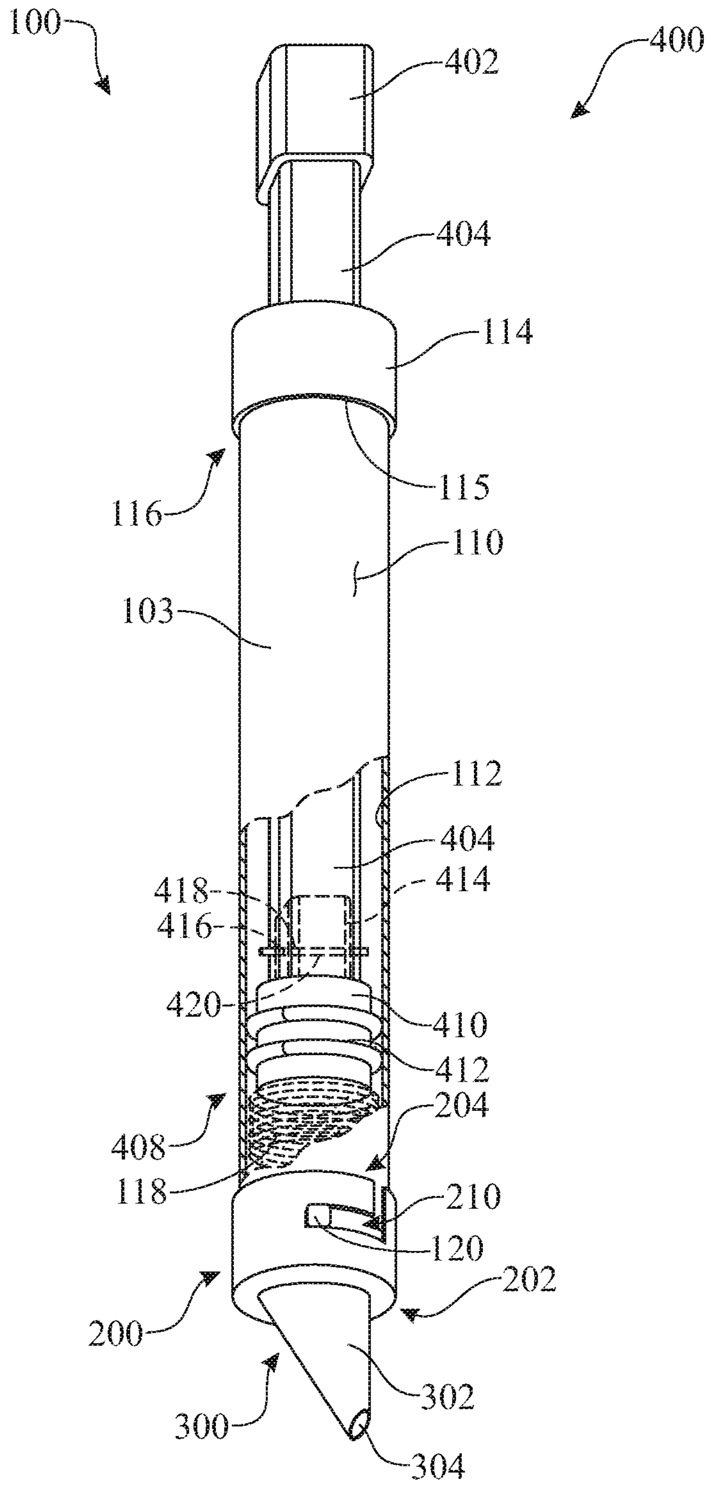
FIG. 4 presents a bottom perspective view of the disposable roof coating applicator that includes a partial cut-out showing the internal workings of the invention.
Figure 6:
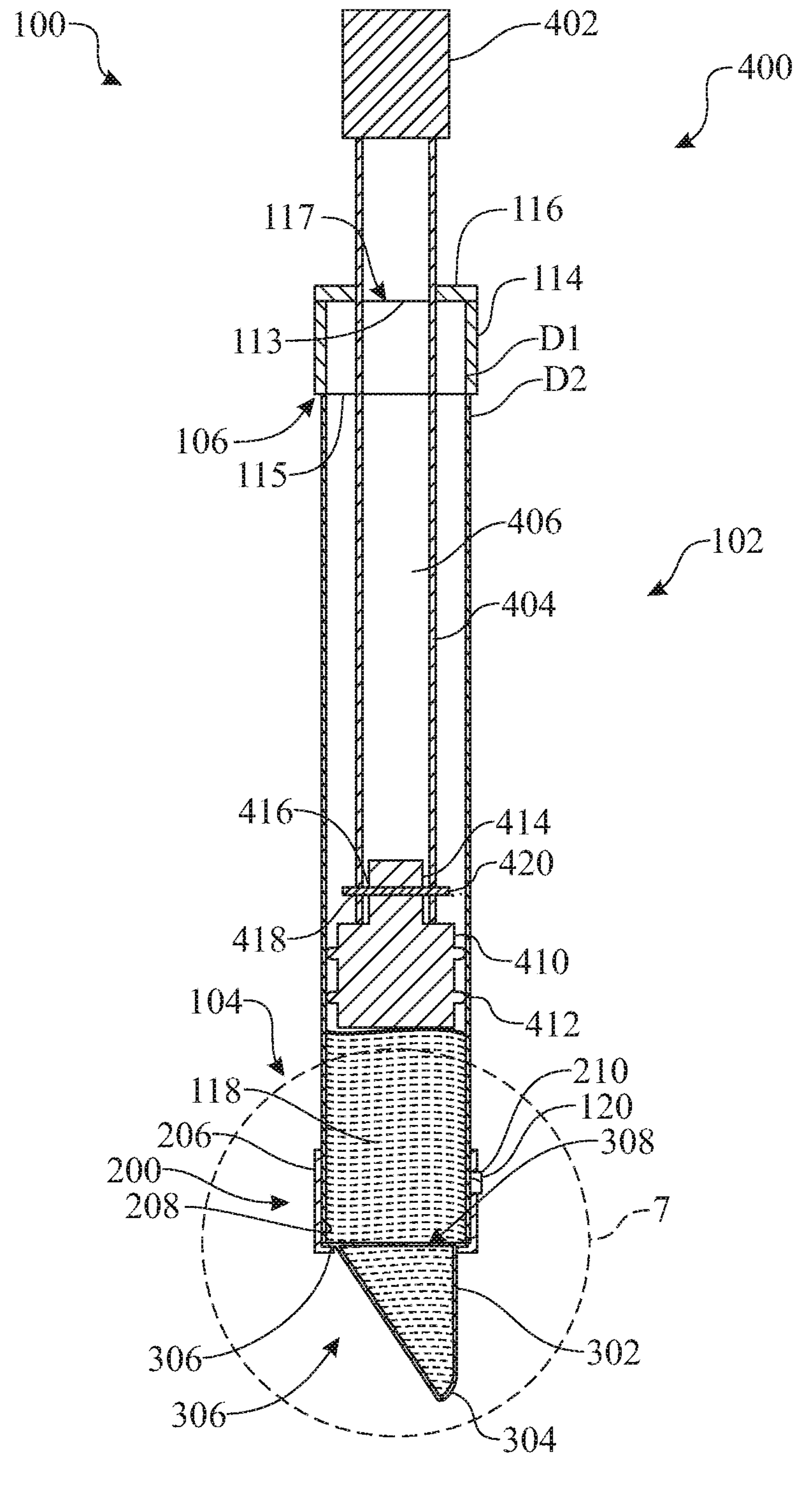
FIG. 6 presents a cross-sectional side elevation view of the disposable roof coating applicator, the section taken along section plane 6-6 indicated in FIG. 1.

Turning now to FIGS. 4-6, the plunger head subassembly 408, which includes the aforementioned head 410 with ribbed protrusions 412 about its outer periphery and the aforementioned second shaft 414 having a secondary shaft having aperture 416, can be then coupled to the front end of shaft 404. The coupling may be done by inserting the second shaft 414 of the plunger head subassembly 408 into the hollow interior 406 of the first shaft 404. Aperture 418 on the first shaft 404 is then aligned with aperture 416 on the second shaft 414, and a locking pin 420 is inserted there through to lock the plunger head subassembly 408 and first shaft 404 together to provide a unique, specialized plunger 400. As can be best seen in FIG. 6, the stop cap 114 at the proximal end 106 of the body 102 is used to confine the plunger 400 within the body's interior space 108 while a rear end of the plunger 400, including the handle 402, extends rearwardly and outwardly of the body 102. However, it should be readily understood that the stop cap 114 does not impede the plunger's longitudinal translation about the body's interior space 118. Instead, the stop cap 114 simply prevents decoupling of plunger 400 from body 102.

Returning to FIGS. 3, 6 and 7, after the front portion of the plunger 400 is confined to the interior space 108 of the body 102, the tip 302 of the nozzle 300 is pushed past the second end 204 of the collar 200, and through the opening 212 until the collar 306 of the nozzle 300 abuts, is stopped, or makes contact with the flange 201 of the collar 200. When the collar 306 of the nozzle and flange 201 of the collar 200 are in contact, the tip 302 of the nozzle 300 projects a distance beyond the first end 202 of the collar 200. The locking mechanism 210 on the collar 200 is then aligned with the stud 120 that is affixed to the exterior side 110 of the body 102. After the stud 120 and opening on the locking mechanism 210 are aligned, the collar 200 may then be slid over the external side 110 of the body 102, until the collar 306 of the nozzle 300 is parallel, abutting, and in contact with the front edge 111 of the distal end 104 of the body 102, and the stud 120 has engaged the locking mechanism 210 on the collar. Once engaged, the collar 200 and nozzle 300 are rotated clock-wise to lock the nozzle 300 and collar 200 in place. The assembly of the roof coating applicator 100 is airtight and thus allows for a pressure gradient within the interior space 108 of the body 102 that in turn allows the intake and application of viscous material 118 into the interior space 108. It should be readily understood that the steps provided to assemble the roof coating applicator 100 may be changed around with the end result being the same. For example, the collar 200 may include threads disposed about the collar's external side that engage a set of threads on the external side 110 of the body 102. This is yet another example of how the collar and tip can be attached to the body 102. Therefore, one of ordinary skill should not limit the assembly process to only the assembly description that has been provided herein above.

Figure 7:
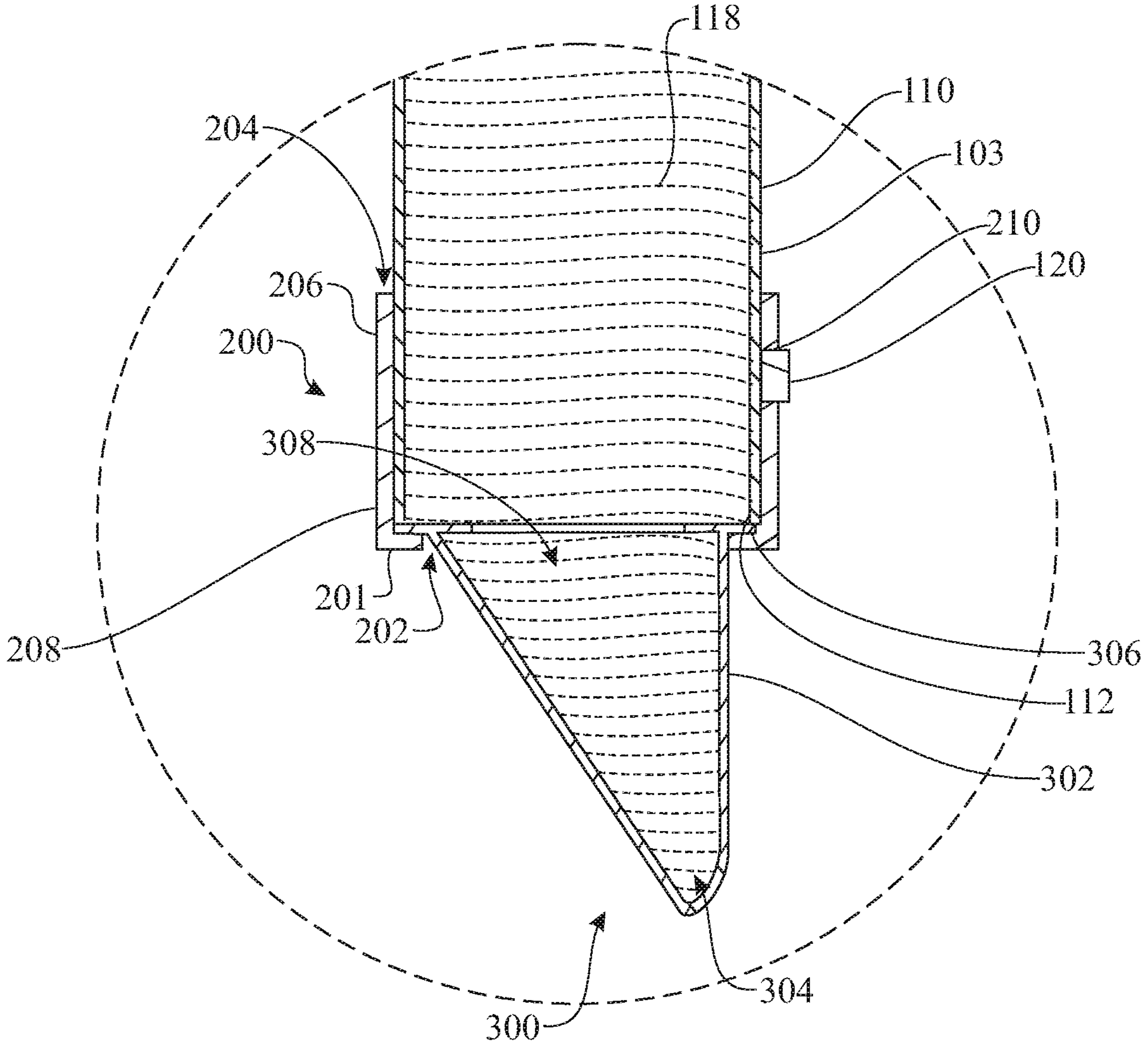
FIG. 7 presents a magnified view of the collar and tip assembly of the disposable roof coating applicator.
Figure 8:
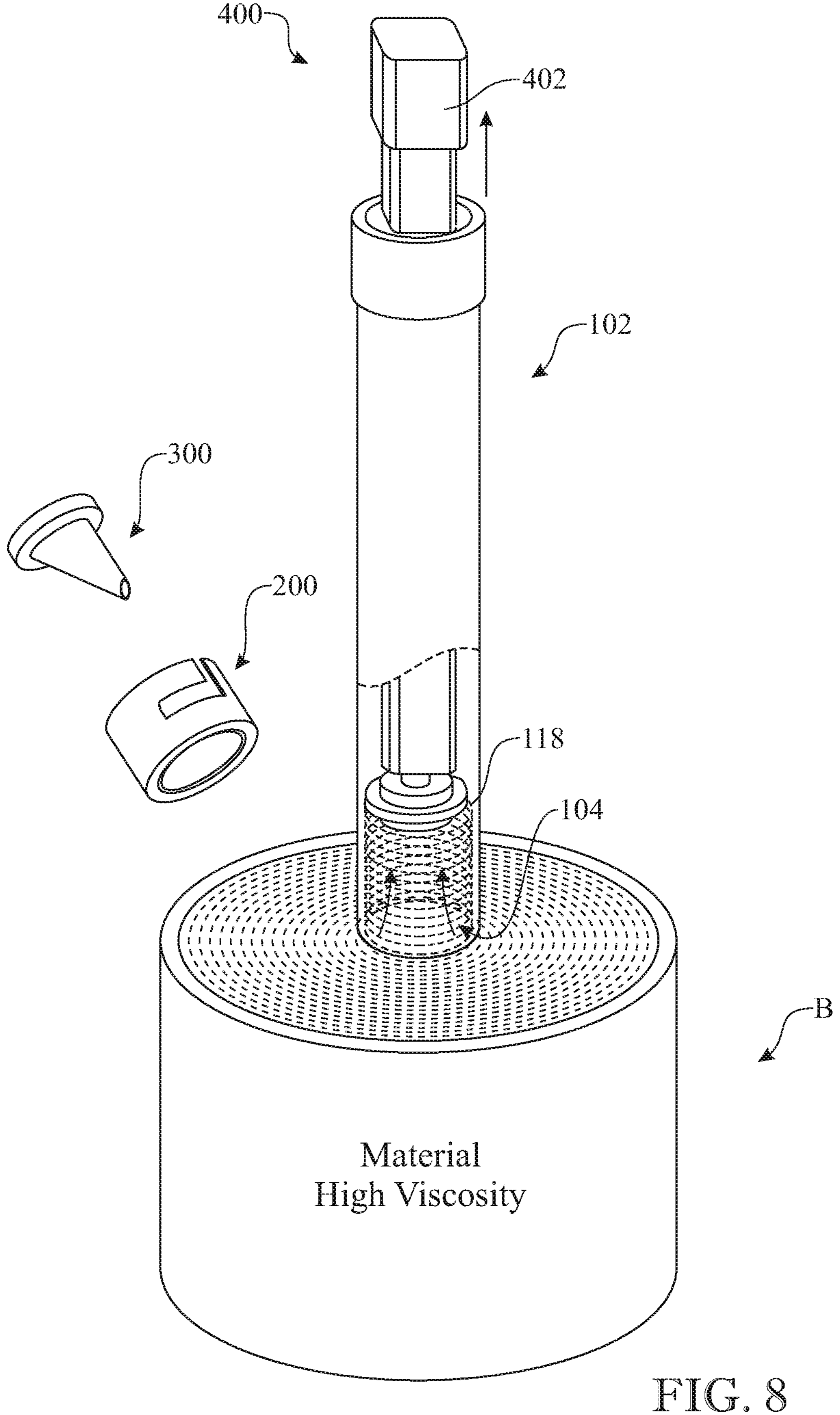
FIG. 8 presents how the disposable roof coating applicator may be loaded with material of high viscosity.

Turning now to FIGS. 3, 7 and 8, an illustrative process of loading and unloading the disposable roof applicator 100 is now described.

The roof coating applicator 100 is designed and otherwise configured to load and unload materials 118 with high viscosity, such as, an elastomeric. For example, during a loading sequence, and after the roof coating applicator 100 has been assembled as described heretofore in one exemplary form, a user may decouple the collar 200 and nozzle 300 from the body 102 by turning the collar 200 counter-clockwise to disengage the locking mechanism 210 from stud 120. Once the collar 200 has been set to an unlock position, the nozzle 300 and collar 200 may be removed and set aside. The now open distal end 104 of the body 102 may be selectively inserted into a bucket of material B that is to be dispensed. Once the distal end 104 of body 102 is partially submerged in material 118, a user may pull on the handle 402 in the opposite direction of the open front end of the body 102, thereby creating a depression or vacuum within the interior space 108 and thus a suction force drawing material 118 into the body's interior space 108. In a preferred embodiment the roof coating applicator may be able to intake, store, transport, and dispense anywhere between a ½ gallon to 2 gallons of material at a time. For those skilled in the art, however, this amount should not be construed as limiting, since the shape and size of the roof coating applicator may vary, allow the applicator to store, transport, or apply more or less material. Once the body 102 of the roof coating applicator 100 has been fully loaded with material 118, or loaded to the desired amount of material 118 needed by the user, the user may then decide to remove any unwanted material 118 from the distal end 104 of the body 102 that was partially submerged in the bucket of material B. After the distal end 104 of the body 102 has been cleaned, the nozzle 300 and collar 200 are coupled to the body 102, as previously described herein above. Although not shown, the roof coating applicator 100 may alternatively be used with a bucket of material B that includes a specialized lid (not shown), allowing the roof coating applicator to intake material from the bucket without having to partially submerge the distal end 104 of the body 102 into the bucket of material B. In another example, the roof coating applicator 100 may be loaded with a prepackaged material pack knowns as "sausage pack," instead of loading the roof applicator with material from a bucket of material. When using a sausage pack, the user decouples the collar 200 and nozzle 300 from the body 102, and inserts the sausage pack into the interior space of the body. The sausage pack is then punctured on the end that faces the nozzle before the nozzle and collar are recoupled to the body.

Figure 9:
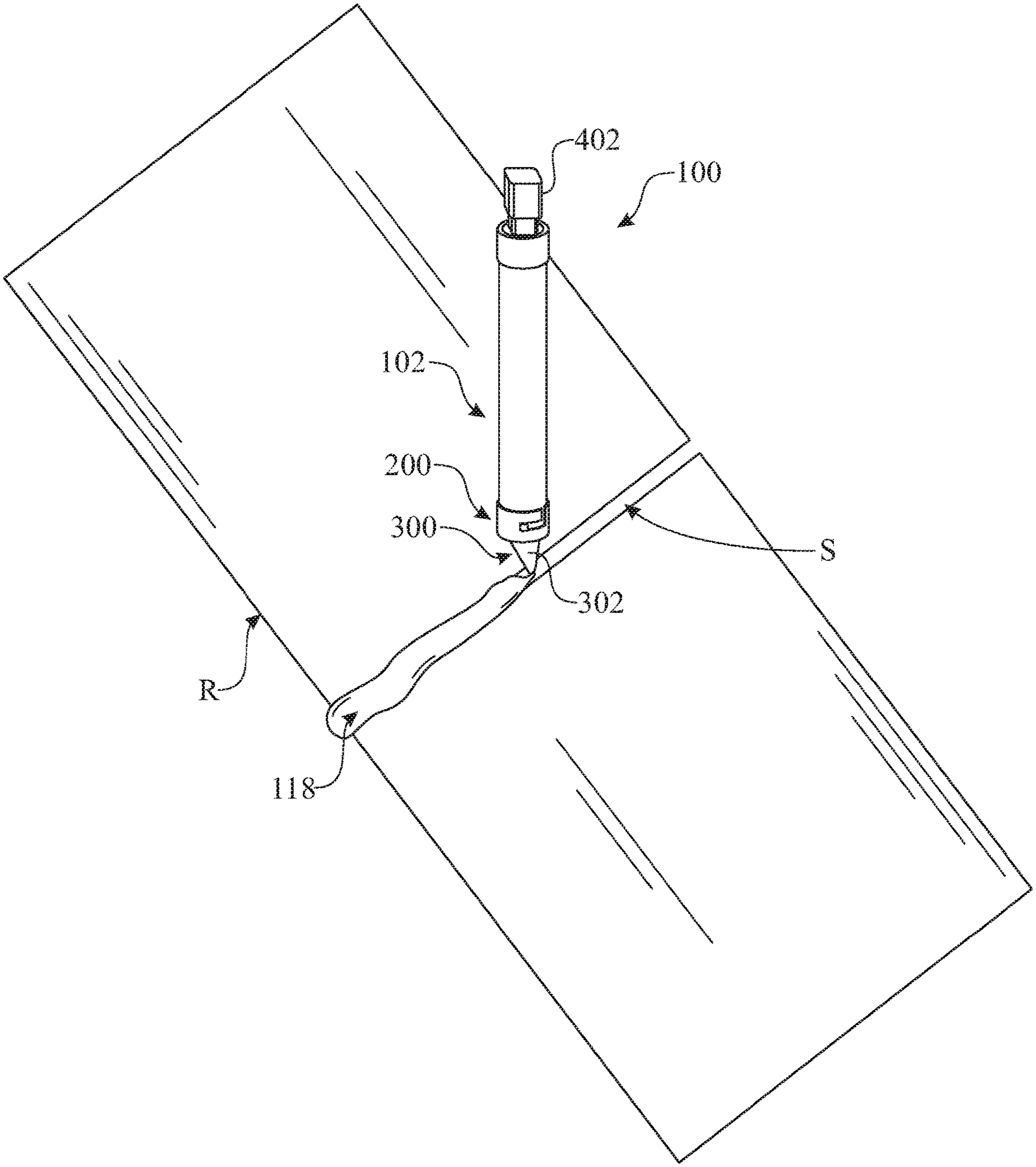
FIG. 9 presents how the disposable roof coating applicator may be utilized to seal a roof seam.

Turning now to FIGS. 6, 7 and 9, once the roof coating applicator 100 has been loaded with enough material 118 as desired by the user, the user can travel either short or long distances with the roof applicator 100 in hand. When the user reaches a seam S on a roof R that requires application of material 118, shown in FIG. 9, the tip 302 of the nozzle 300 is pointed in the direction of the seam S. The user then pushes on the plunger's 400 handle 402, which causes the plunger head 410 to push material along the interior space 108 of the body 102, through the nozzle's receiving hole 308 and out of the nozzle's application hole 304. The nozzle's 300 configuration allows for the user to apply a necessary amount of material 118 to the seam S or joint being sealed. Although it is not shown in the accompanying figures, the roof coating applicator 100 is designed and otherwise configured to allow if so desired by a user to apply a necessary amount of material to a seam S or joint while in an upright position (i.e., standing position). The roof coating applicator 100 is also designed to be utilized by a user to apply material to a seam S or joint accurately and effectively without wasting material or making a mess. The amount of material 118 being applied to the joint or seam S can be adjusted by increasing or decreasing the pressure applied with plunger 400. In instances where the seam S is too large for the nozzle tip 302 to apply an effective amount of material 118, the user may selectively decouple the collar 200 and nozzle 300 from the body 102 and directly apply material to the seam through the open end of the distal end 104 of the body 102. After all of the material has been exhausted, or applied, the user may return to the material of bucket B, and follow the intake steps that have been described herein above (or load a new sausage pack). The user may use the roof coating applicator 100 to load and apply material as many times as needed to cover all seams, joints, or the like before choosing to dispose of the applicator 100. Alternatively, the user may decide to clean the nozzle 300, collar 200, body 102, and plunger assembly 400 with water and/or any chemical substances that removes traces of the material 118 that was being used. After the roof coating applicator 100 is clean, the user may then store the device and use it on another job.

In summary, the disposable roof coating applicator, or roof tube, is a light weight, low-cost tool to manufacture that can be used to dispense various materials of high viscosity, such as, elastomeric roof coating. The roof applicator allows a user to apply material to seams and joints quickly, neatly, and accurately with minimal waste. It also allows the user to apply a necessary amount of material to properly seal a seam, or joint, while the user remains in an upright position (i.e., standing up). The roof coating applicator is designed to reduce the possibility of clogging—which means that the roof coating applicator can be used in lower temperatures that would otherwise cause other elastomeric (or high viscous material) application systems to clog and fail.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A method for applying a viscous material, comprising:
providing a hand tool configured to apply viscous material, comprising
a body having a proximal end, a distal end, and an interior space configured to retain up to two gallons of the viscous material;
a nozzle selectively attachable to the distal end of the body; and
a plunger assembly including a handle axially aligned with the body, the plunger assembly movably disposable within the interior space of the body; and
pressing on the handle manually to push the viscous material out of the interior space and onto a surface through the nozzle.

2. The method of claim 1, wherein the interior space of the body is configured to retain ½ gallon of viscous material.

3. The method of claim 1, wherein the interior space of the body is configured to retain a gallon of viscous material.

4. The method of claim 1, wherein the plunger assembly comprises,
an elongated member having a first end and a second end;
a head subassembly attached to the member at the first end; and
a handle attached to the member at the second end, opposite the first end,
wherein the head subassembly and the elongated member are movably disposable within the interior space of the body.

5. The method of claim 1, wherein the nozzle includes an irregular cone-shaped head.

6. The method of claim 1, wherein the nozzle includes a cylindrically shaped body with a flanged head.

7. The method of claim 1, wherein the nozzle is threadedly mounted to the distal end of the body.

8. The method of claim 1, wherein the nozzle includes a cylindrically shaped body with an angled head portion.

9. The method of claim 8, wherein the angled head portion is angled within a range of 20 degrees and 25 degrees from the cylindrically shaped body.

10. The method of claim 1, wherein the nozzle includes an application head with a control valve.

11. A method for applying a viscous material, comprising:
providing a hand tool configured to apply viscous material, comprising
a body having a proximal end, a distal end, and an interior space configured to retain up to two gallons of the viscous material;
a plurality of interchangeable nozzles selectively attachable to the distal end of the body; and
a plunger assembly including a handle axially aligned with the body, the plunger assembly movably disposable within the interior space of the body; and
pressing on the handle manually to push the viscous material out of the interior space and onto a surface through the nozzle.

12. The method of claim 11, wherein at least one nozzle includes an irregular cone-shaped head.

13. The method of claim 11, wherein at least one nozzle includes a cylindrically shaped body with a flanged head.

14. The method of claim 11, wherein at least one nozzle is threadedly mounted to the distal end of the body.

15. The method of claim 11, wherein at least one nozzle includes a cylindrically shaped body with an angled head portion.

16. A method for applying a viscous material, comprising:
providing a hand tool configured to apply viscous material, comprising
a body having a proximal end, a distal end, and an interior space configured to retain up to two gallons of the viscous material;
a nozzle selectively attachable to the distal end of the body; and
a plunger assembly including a handle axially aligned with the body, the plunger assembly movably disposable within the interior space of the body; and
inserting the distal end of the hand tool without the nozzle into a receptacle containing viscous material;
pulling on the handle manually to draw viscous material from the receptacle into the interior space of the hand tool; and
pressing on the handle manually to push the viscous material out of the interior space and onto a surface with or without the nozzle.

17. The method of claim 16, wherein the plunger assembly comprises,
an elongated member having a first end and a second end;
a head subassembly attached to the member at the first end; and
a handle attached to the member at the second end, opposite the first end,
wherein the head subassembly and the elongated member are movably disposable within the interior space of the body.

18. The method of claim 17, wherein the nozzle is threadedly mounted to the distal end of the body.

19. The method of claim 17, wherein nozzle includes any one of a nozzle with an irregular cone-shaped head, a nozzle with a cylindrically shaped body with a flanged head, a nozzle with a cylindrically shaped body with an angled head portion, or a nozzle with an application head with a control valve.

20. The method of claim 17, wherein the interior space of the body is configured to retain at least ½ gallon of viscous material.

* * * * *